United States Patent
Garnweidner et al.

(10) Patent No.: US 6,948,738 B2
(45) Date of Patent: Sep. 27, 2005

(54) DEVICE FOR THE PROTECTION OF THE LEGS OF A VEHICLE OCCUPANT

(75) Inventors: Peter Garnweidner, Lamprechtshausen (AT); Manfred Mokre, St. Peter (AT)

(73) Assignee: Euromotive GmbH & Co. KG, Ranshofen (AU)

( * ) Notice: Subject to any disclaimer, the term of this patent is extended or adjusted under 35 U.S.C. 154(b) by 0 days.

(21) Appl. No.: 10/653,135

(22) Filed: Sep. 3, 2003

(65) Prior Publication Data

US 2004/0041385 A1 Mar. 4, 2004

(30) Foreign Application Priority Data

Sep. 3, 2002 (DE) .......................................... 102 40 646

(51) Int. Cl.$^7$ ............................................. B60R 21/045
(52) U.S. Cl. ........................ 280/752; 297/487; 297/488
(58) Field of Search ................................. 280/748, 750, 280/751, 752; 297/487, 488; 188/371, 372

(56) References Cited

U.S. PATENT DOCUMENTS

| | | | | |
|---|---|---|---|---|
| 4,709,943 A | * | 12/1987 | Yoshimura et al. | ......... 280/751 |
| 4,893,834 A | | 1/1990 | Honda et al. | |
| 5,096,223 A | | 3/1992 | Tekelly et al. | |
| 5,201,544 A | * | 4/1993 | Matano et al. | ............... 280/751 |
| 5,238,286 A | | 8/1993 | Tanaka et al. | |
| 5,273,314 A | * | 12/1993 | Sakakibara | ................. 280/752 |
| 5,370,417 A | * | 12/1994 | Kelman et al. | ............. 280/751 |
| 5,518,270 A | * | 5/1996 | Hanada et al. | ............... 280/751 |
| 5,752,718 A | | 5/1998 | Schnabel et al. | |
| 6,139,082 A | * | 10/2000 | Davis et al. | ................... 296/72 |
| 6,296,277 B1 | | 10/2001 | Bittinger et al. | |
| 6,609,727 B2 | * | 8/2003 | Figlioli et al. | .............. 280/752 |
| 6,783,156 B2 | * | 8/2004 | Chickmenahalli et al. | .. 280/752 |
| 6,793,246 B2 | * | 9/2004 | Horsch | ........................ 280/751 |

FOREIGN PATENT DOCUMENTS

| | | |
|---|---|---|
| DE | 42-06-782 | 9/1992 |
| DE | 43 07 836 A1 | 9/1993 |
| DE | 195 37 408 C1 | 10/1995 |
| DE | 195-37-408 | 12/1996 |
| DE | 198-53-346 | 5/2000 |
| DE | 198 53 346 A1 | 5/2000 |
| DE | 100 60 636 A1 | 7/2002 |
| JP | 07-172255 | 11/1995 |

\* cited by examiner

*Primary Examiner*—Paul N. Dickson
*Assistant Examiner*—Toan C. To
(74) *Attorney, Agent, or Firm*—Nixon Peabody LLP; David S. Safran

(57) ABSTRACT

A device for the protection of the legs of a vehicle occupant in the event of a frontal impact of the vehicle. In the leg area, cuff plates (2) are arranged on a central tube (1) in the longitudinal direction of the vehicle. The cuff plates carry a load distributor (3) at their free end, and absorb the impact energy of the legs of the vehicle occupants in the event of the frontal impact. Load distributor 3 transfers the impact energy present to cuff plates 2, which then roll away and thus remove energy.

8 Claims, 6 Drawing Sheets

DEVICE FOR THE PROTECTION OF THE LEGS OF A VEHICLE OCCUPANT

BACKGROUND OF THE INVENTION

1. Field of the Invention

The invention relates to a device for the protection of the legs of a vehicle occupant in the event of a frontal impact of the vehicle.

2. Description of Related Art

In the event of a frontal impact of a vehicle, for example, a motor vehicle, it is necessary to provide a device for the protection of the vehicle occupants that absorbs the impact energy of the knees and the legs.

For this purpose, it is known to provide deformation elements made of steel, aluminium or plastic foam between a central frame part or central tube, which runs in the transverse direction in the vehicle, and the knee and leg area of the vehicle occupants, in particular, the vehicle occupants on the front seat. The deformation elements are arranged such that they are located directly in front of the knees of a vehicle occupant when the latter has assumed his/her ideal sitting position. Such a deformation element is known from Published German Patent Application DE 10 060 636 A1, and comprises a honeycombed hollow body with a tension strap.

For the purpose of checking the vehicle safety, the sitting position of the vehicle occupant is rigidly prescribed in the corresponding vehicle regulations, but each person in fact assumes a different sitting position, so that the position of the knees in the available foot room varies in the transverse direction of the vehicle. On account of the different body sizes of the vehicle occupants, this position also varies in the height direction. Bent or stretched legs, furthermore, lead to different movement directions of the knees in the event of a vehicle impact. Evaluations of crash tests have shown that the path of the knee at the outset can be described as being virtually circular about the ankle joint.

In the event of an impact, there is the problem that more and more components become deformed with increasing intrusion of the legs and the knees of the vehicle occupants into the dashboard on the driver's side and into the glove box on the front-seat passenger side, as a result of which additional forces are built up.

However, as is shown in FIG. 6, the use of known honeycomb deformation elements leads to a force curve that results from the fact that the known deformation elements work like pressure springs arranged one behind the other. As a result, different force levels arise in the force curve, but they are always increasing. Accordingly, in order not to exceed the biomechanical limiting values in the event of an impact when more and more components are becoming deformed, a reduction of the force level in the force curve of the deformation elements is desired.

Since the known deformation elements have a prescribed deformation direction, reductions in the protective effect can occur in the event of deviations of the load direction from this prescribed deformation direction due to bending of the deformation elements in the transverse direction and in the height direction.

The known deformation elements, moreover, are disadvantageous inasmuch as they comprise extruded profiles which are associated with high costs, and their arrangement in the knee area greatly restricts the installation space available for other components, for example, the glove box on the front-seat passenger side or the vehicle electronics on the driver's side.

SUMMARY OF THE INVENTION

The problem underlying the invention, therefore, lies in providing a device of the type mentioned above, which is designed in such a way that a force curve with a diminishing force level results.

The device according to the invention should in particular be designed such that it can also reduce occurring impact forces and impact energies when the load direction varies.

On the other hand, the problem underlying the invention also involves providing a device of the type mentioned at the outset, which is designed such that it can also reduce occurring impact forces and impact energies when the load direction varies.

This problem is solved accorded the invention by turn-back or cuff plates arranged on a central frame part in the leg area in the longitudinal direction of the vehicle, the cuff plates carrying, at their free ends, load distributors which absorb the impact energy of the legs of the vehicle occupant in the event of a frontal impact.

A particularly preferred example of embodiment of the invention will be described below in greater detail with the aid of the accompanying drawings.

DETAILED DESCRIPTION OF THE INVENTION

Figure 1A:
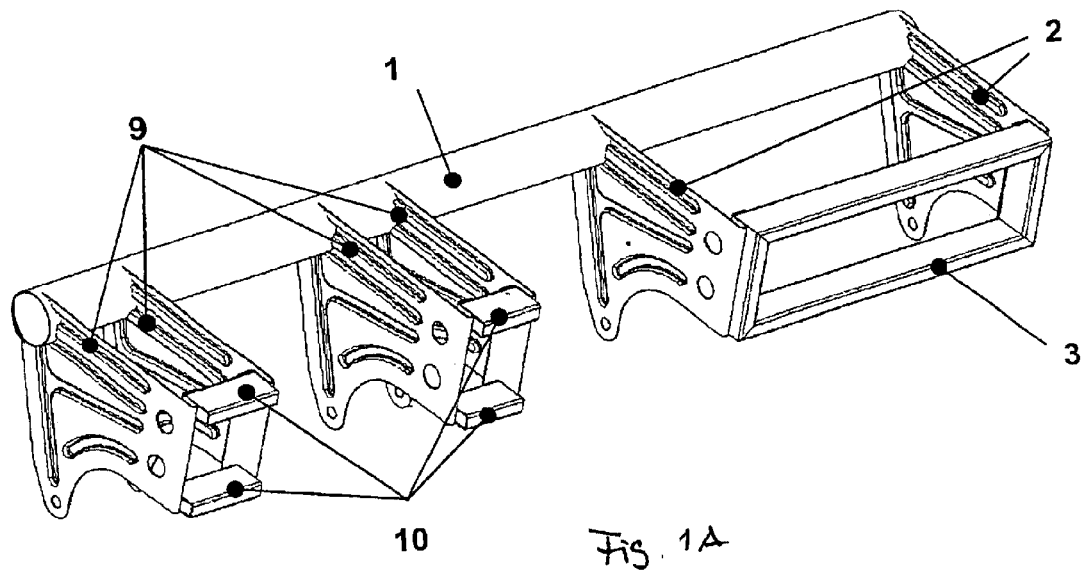
FIGS. 1A & 1B are perspective views of an embodiment of the device according to the invention, FIG. 1A being before a frontal impact and FIG. 1B being after a frontal impact.

In the case of the embodiment of the device according to the invention for the protection of the legs of a vehicle occupant shown in the drawings, in the event of a frontal impact of the vehicle, turn-back or cuff plates 2 are fitted to a central frame part or central tube 1 in the longitudinal direction, i.e., in the XZ plane of the vehicle, the cuff plates carrying a load distributor 3 at their free end. This load distributor 3 is arranged such that, in the event of a frontal impact of the vehicle, the vehicle occupants strike the load distributor with their legs and knees, so that the load distributor absorbs the impact energy of the legs of the vehicle occupants.

Figure 7:
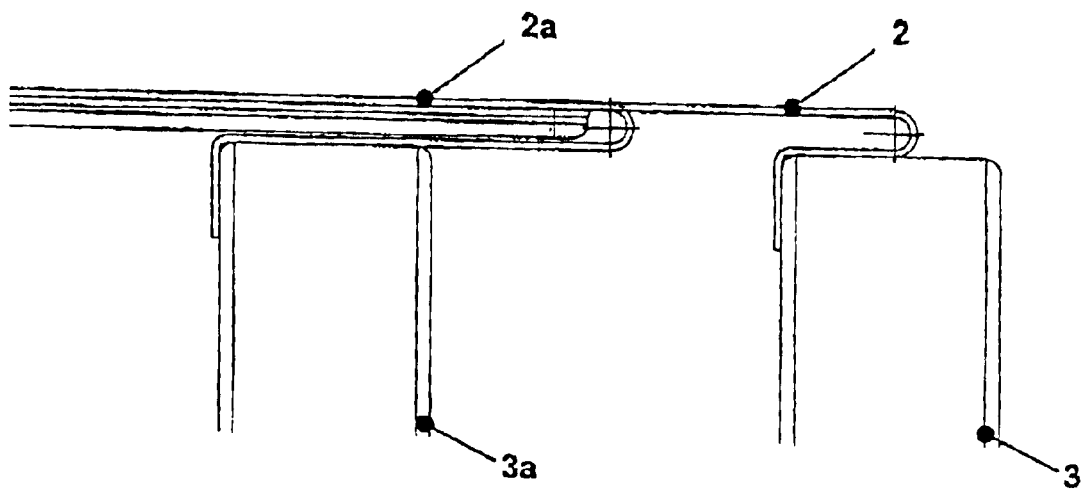

As is shown in detail in FIG. 7, cuff plates 2 and load distributor 3 are designed such that load distributor 3 is fitted to a flanged or turned-back part of cuff plates 2 and in the event of an impact goes over into position 3a, in which cuff plate 2 is further unrolled, as a result of which corresponding energy is removed. The final position of the cuff plate is designated by 2a. This is characterized by the fact that a fairly large part of cuff plate 2 is flanged.

Figure 2:
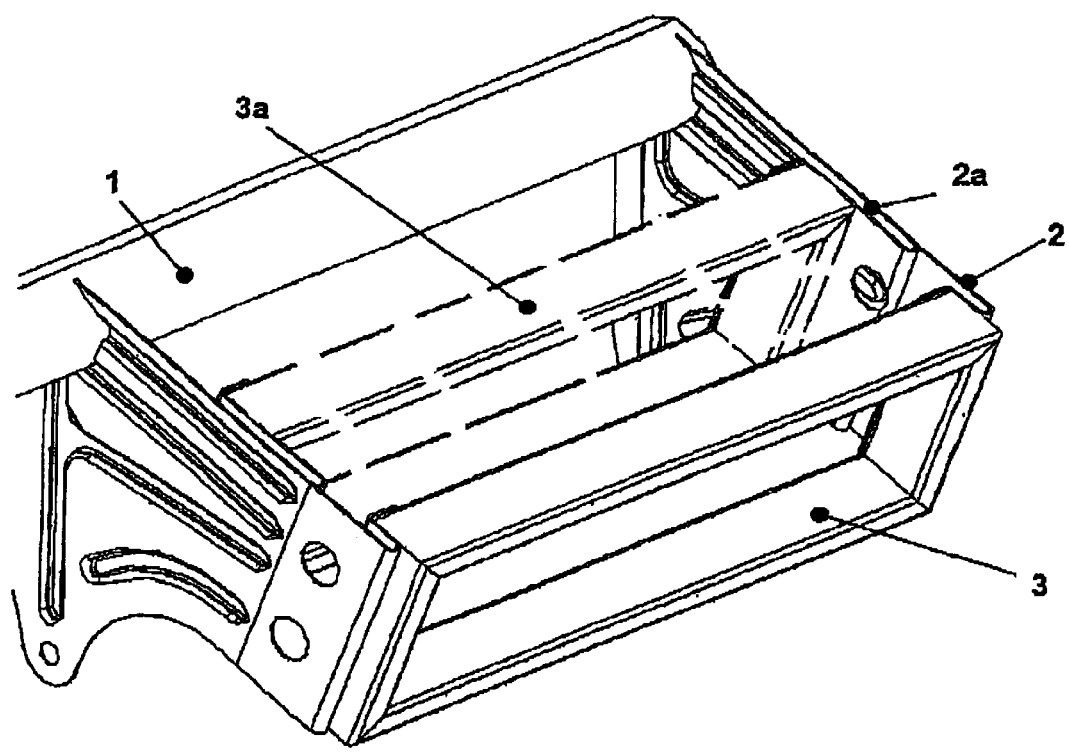
FIG. 2 is a perspective view of the position of the cuff plates and the load distributor before and after a frontal impact in detail.

The arrangement and design of cuff plates 2 and load distributor 3 on the front-seat passenger side, before and after a frontal impact, are shown in detail in FIG. 2.

Figure 1B:
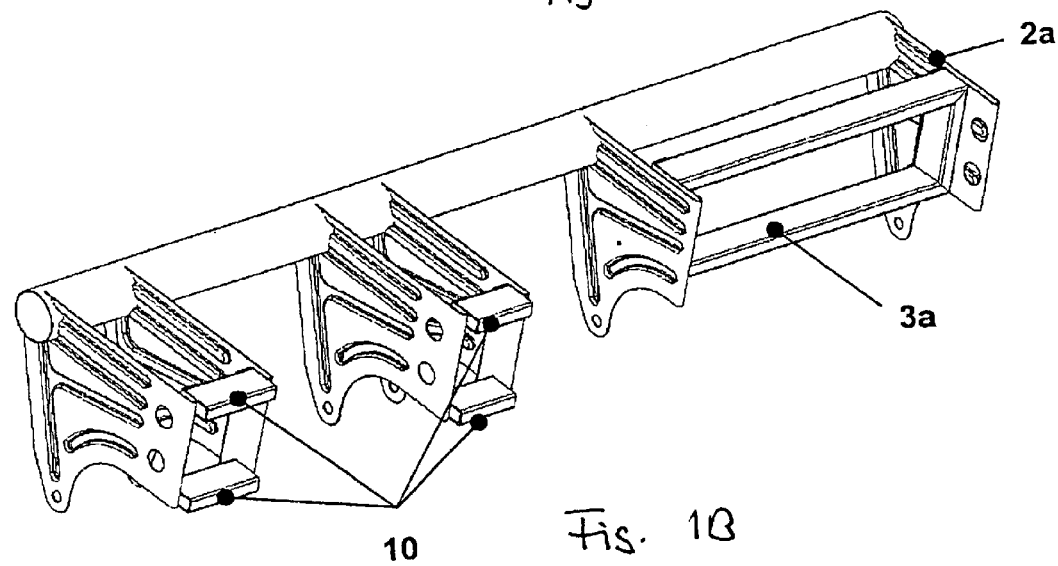

In FIGS. 1A & 1B, cuff plates 2 and load distributor 3 are shown on the front-seat passenger side and cuff plates 9 and load distributor 10 on the driver's side respectively. The undeformed state is shown in FIG. 1A, while FIG. 1B shows the deformed state on the front-seat passenger side, in which the cuff plates and the load distributors have assumed positions 2a and 3a. This is shown in detail in FIG. 2.

Figure 3:
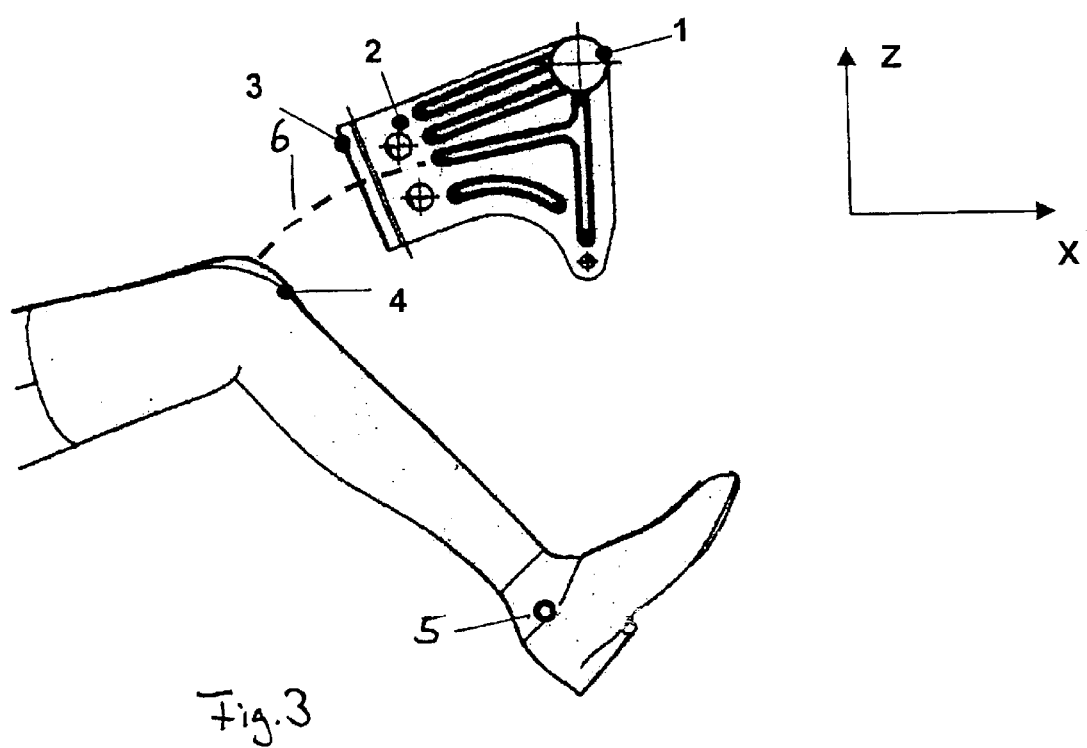
FIG. 3 is a diagrammatic view of the relationship between the embodiment of the device according to the invention and the legs and knees of a vehicle occupant.

In practice, cuff plates 2 have a height of approx. 100 mm and the geometrical moment of inertia about the X axis in FIG. 3 is very large. The flanging running over the length of the cuff plate in this axial direction is very stiff and stands normal on the sheet metal off-cut. In the event of a deviation of the impact direction in the XZ plane of FIG. 3, the effects are thus negligible, since at the very most the deformation direction could run slightly obliquely. Furthermore, with the design according to the invention, the connecting point of the cuff plates on the bodywork side can be provided much closer to the load distributor than is the case with known arrangements, since the latter is, on the one hand, arranged laterally, and in addition, a length transformation occurs inasmuch as the displacement of the load distributor in the X direction in the event of an impact is in a ratio of 2:1 to the displacement of the flanged edge of the cuff plate.

Figure 4:
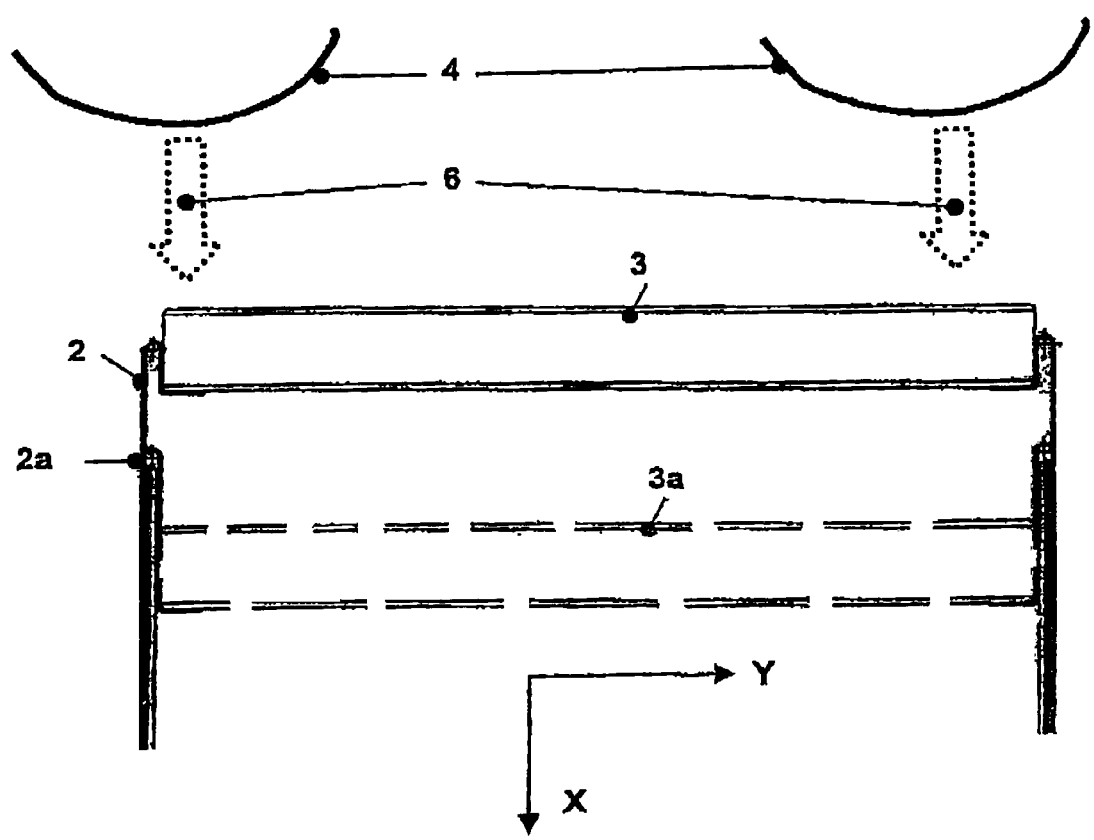
FIG. 4 is a sectional view of the device according to the invention in the XY plane.

Normally, the whole assembly represented in FIGS. 1A & 1B is bordered by the bodywork shell, i.e., the A column, namely, the door post at the front on the right and left, and the sheet metal parts are lengthened downwards in the middle and bolted there to the vehicle tunnel. This bolting to the vehicle tunnel is standard with present-day vehicles, in order to increase the natural frequency of the transverse support, and does not therefore represent any additional expenditure. In the event of a deviation of the impact direction in the XY plane in FIG. 4, i.e., obliquely outwards or inwards, there is thus no need to fear any effect on the cuff or flange behavior of the cuff plates.

Figure 6:
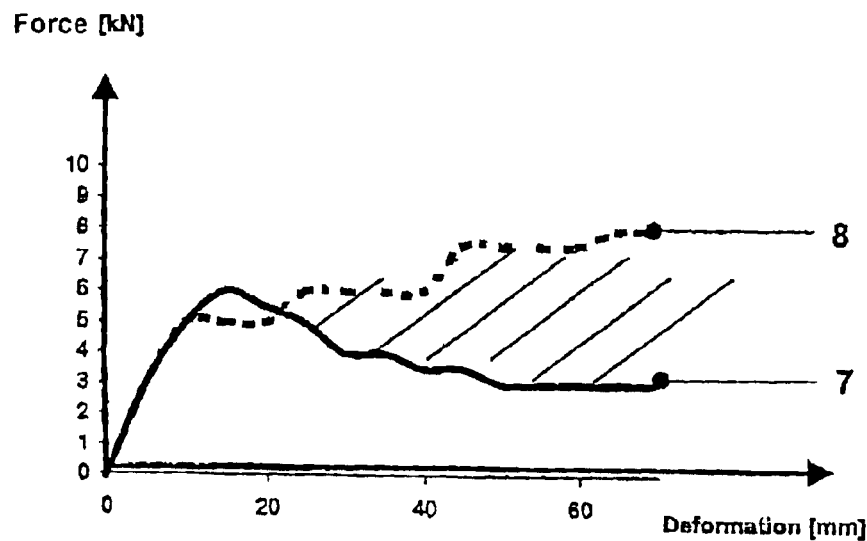
FIG. 6 shows the force curve with an embodiment of the device according to the invention and also with an embodiment of the known honeycomb deformation elements and FIG. 7 shows, in plan view, the mode of operation of the embodiment of the device according to the invention.

As is shown in FIG. 3, the knees and legs of a vehicle occupant move in the event of a frontal impact along knee-path curve 6, shown by the dashed line, in a circular manner about ankle joint 5 as the point of rotation in the direction of load distributor 3. With the subsequent deformation of cuff plates 2, in which the cuff plates roll away and remove energy, the force curve 7 shown in FIG. 6 results. This curve shows that a reduction in the force level is possible with the device according to the invention, which is not possible with the use of known deformation elements with force curve 8.

Figure 5:
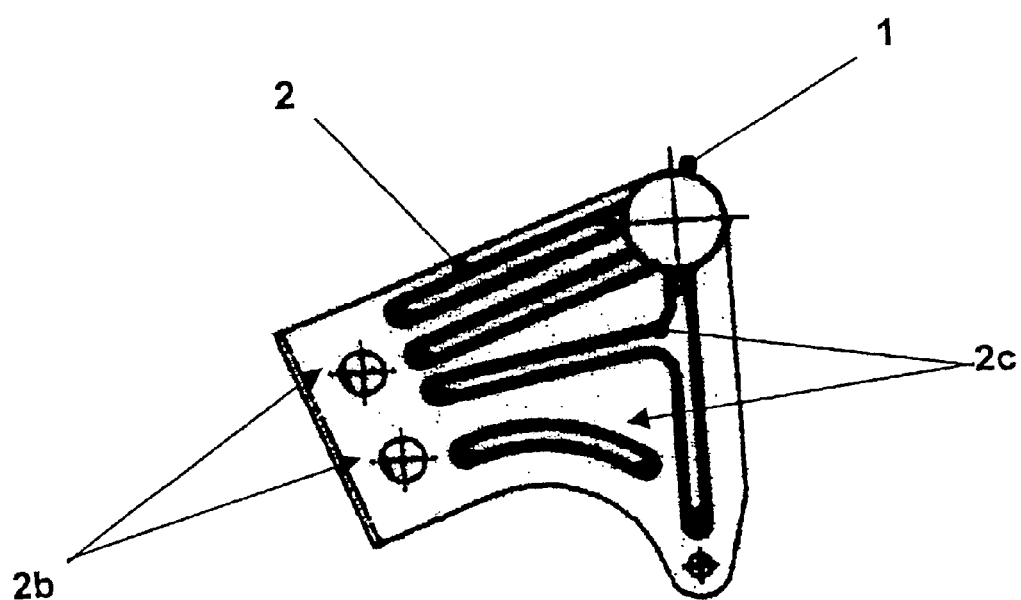
FIG. 5 is a side view of a cuff plate in detail.

As is shown in detail in FIG. 5, it is possible to provide weakening cutouts 2b or stiffening fins 2c in cuff plates 2, by means of which the force level can be increased or reduced selectively.

The use of cuff plates with load distributors fitted thereto has the further advantage that other components can also be fixed to cuff plates 2, so that cuff plates 2 do not necessarily have to be additional components, but can assume the function of standard sheet metal holders or ties. It is also possible to design the tunnel support, for example, which runs between the central tube and the tunnel, as a cuff plate. Load distributor 3 is preferably frame-shaped, so that it passes on the occurring forces directly to cuff plates 2.

Finally, the use of cuff plates 2 also means that the installation space in the leg area is reduced insignificantly, so that, on the front-seat passenger side, for example, the full glove box size can be retained.

What is claimed is:

1. A device for the protection of the legs of a vehicle occupant in the event of a frontal impact of a vehicle, comprising:

a central frame part, cuff plates arranged in a longitudinal direction of the vehicle and fitted to the central frame part in a leg area of the vehicle, and a load distributor, said load distributor being carried at free ends of the cuff plates which absorbs impact energy of the legs of the vehicle occupant in the event of the frontal impact;

wherein the free ends of the cuff plates are turned-back flange parts that are directed back toward the central frame part; and wherein said turned-back flange parts increase in length as an impact energy absorbing mechanism in response to impact loading of the load distributor.

2. The device according to claim 1, wherein the cuff plates are provided with stiffening fins.

3. The device according to claim 2, wherein weakening cutouts are provided in the cuff plates.

4. The device according to claim 1, wherein weakening cutouts are provided in the cuff plates.

5. The device according to claim 1, wherein the cuff plates are adapted for connection to a tunnel of a motor vehicle for supporting the central frame part thereon.

6. The device according to claim 3, wherein the load distributor is frame-shaped.

7. The device according to claim 2, wherein the load distributor is frame-shaped.

8. The device according to claim 1, wherein the toad distributor is frame-shaped.

* * * * *